United States Patent Office 2,740,769
Patented Apr. 3, 1956

2,740,769

METHOD FOR PREPARING INTERPOLYMERS OF VINYLIDENE CYANIDE WITH ALIPHATIC CONJUGATED DIOLEFINS

Harry Gilbert, Cuyahoga Falls, and Floyd F. Miller, Wadsworth, Ohio, assignors to The B. F. Goodrich Company, New York, N. Y., a corporation of New York No Drawing. Application March 31, 1953,
Serial No. 346,041

9 Claims. (Cl. 260—78.5)

This invention relates to a method for preparing interpolymers of vinylidene cyanide with aliphatic conjugated diolefins and pertains particularly to the preparation of such interpolymers by carrying out the polymerization in the presence of a catalyst mixture comprising sulfur dioxide and an organic thiol.

U. S. Patents 2,615,872 and 2,615,873 disclose methods for preparing copolymers of vinylidene cyanide and aliphatic conjugated diolefins. Disclosed therein is the characteristic of vinylidene cyanide to polymerize on contact with water and instantaneously form the resinous homopolymer. It is also disclosed therein that vinylidene cyanide and the aliphatic conjugated diolefins exhibit a very strong tendency to react in such a manner as to form a Diels-Alder adduct, and that this reaction always competes very strongly with the polymerization reaction. As a result of this competing reaction, the polymerization often proceeds slowly and only relatively small conversions of monomers to polymer are obtained, with the adduct formation consuming a considerable quantity of the monomers before polymerization can occur.

Accordingly, it is an object of the present invention to provide a process for preparing interpolymers containing vinylidene cyanide and aliphatic conjugated dienes whereby high conversions of monomers to polymer are obtained.

It is another object of this invention to provide catalysts which accelerate the polymerization of monomeric mixtures containing vinylidene cyanide and aliphatic conjugated dienes to such a degree that polymerization of substantially all the monomers occurs before Diels-Alder adduct formation can occur in a significant amount. Other objects will be apparent from the description which follows.

It has now been discovered that the above and other objects are readily attained by polymerizing monomeric mixtures containing vinylidene cyanide and an aliphatic conjugated diene in the presence of sulfur dioxide and an organic thiol. By carrying out the polymerization in this manner, adduct formation is negligible and nearly quantitative yields of polymer are obtained. Moreover, the polymerization time is greatly decreased so that the present process is operated much more economically than the same polymerization utilizing conventional polymerization catalysts such as organic peroxides, diazo compounds and the like.

The unique process of the present invention may be utilized in preparing all copolymers of vinylidene cyanide with aliphatic conjugated diolefins, as well as interpolymers containing three or more monomeric constituents, at least two of which are vinylidene cyanide and an aliphatic conjugated diolefin. For example, the combination of sulfur dioxide and an organic thiol are effectively utilized to catalyze the polymerization of vinylidene cyanide with such aliphatic conjugated dienes as butadiene-1,3, isoprene, piperylene, 2,3-dimethyl butadiene-1,3, 1,2-dimethyl butadiene-1,3, 1-ethyl butadiene-1,3, 2-neopentyl butadiene-1,3, phenyl butadiene, 2-methyl pentadiene-1,3, 2-chloro-butadiene-1,3, 2-bromo-butadiene-1,3, 1-bromo-2-methyl-butadiene, 1-iodo-3-methyl-butadiene-1,3 and the like.

The process of this invention may also be utilized in the preparation of interpolymers containing vinylidene cyanide, a diolefin of the type disclosed hereinabove and one or more other polymerizable materials which may be a vinyl or vinylidene compound, an aliphatic conjugated diene, a vinyl ester, a vinyl halide, an acrylic or methacrylic acid ester, an allyl ester, styrene or a substituted styrene, acrylonitrile, a monoolefinic hydrocarbon such as isobutylene, 1,2-dihaloethylenes or the like, as well as other polymerizable materials. Preferably the third monomer, if one is utilized, contains a terminal methylene group ($CH_2$) attached by a double bond to a second carbon atom, that is, it possesses the $CR_2=C<$ group. The process has been found to be particularly useful in polymerizing a monomeric mixture consisting of vinylidene cyanide, butadiene-1,3 and styrene, and also a monomeric mixture consisting of vinylidene cyanide, butadiene-1,3 and a second aliphatic conjugated diene such as isoprene or the like.

Any organic thiol (mercaptan), that is, any compound of the structure RSH, wherein R is an organic radical, may be utilized as the thiol component of the thiol-sulfur dioxide catalyst mixture of the present invention. The thiol may be a primary, secondary or tertiary compound. Included within this class of compounds are aromatic thiols such as benzenethiol (thiophenol), naphthalenethiols such as 2-naphthalenethiols (thionaphthol), 8-quinolinethiol, 3-methyl cyclohexanethiol, o, m and p-toluenethiols (thiocresols), xylenethiols, alpha-toluenethiol and the like; and aliphatic thiols such as methanethiol, ethanethiol, 1-propanethiol, 2-propanethiol, 1-butanethiol, 2-butanethiol, 1-hexanethiol, dodecanethiol, 2-mercaptoethanol, gamma-mercapto-alpha beta-dimethyl butyric acid and the like. It is to be understood that the above compounds represent but a few of the organic thiols which may be utilized, since any of the generic class of organic thiols are operative in the process of the present invention. Those thiols most useful are those which do not contain strongly ionizable substituents such as the amines. A preferred group includes those wherein R is an alkyl or aryl hydrocarbon radical. The aromatic thiols form a more preferred class of thiols for use in this invention. Mixtures of thiols are particularly useful.

The respective quantities of the organic thiol and the sulfur dioxide are subject to wide variation. The function of the mixture of the thiol and the sulfur dioxide is that of a catalyst or initiator and consequently, any catalytic quantity may be used. The examples show the use of approximately 0.7 to 3.0% of the sulfur dioxide component and approximately 1.6 to 3.2% by weight of the organic thiol (based on the weight of the monomers in the polymerization charge). However, smaller amounts, for example, about 0.01% or even less such as about 0.002% of each component based on the total weight of monomers or larger amounts of 5% or more may be utilized, the larger amounts being preferably used in systems where the polymerization ordinarily proceeds quite slowly.

The organic thiol and sulfur dioxide can be admixed and stored as the mixture for periods of time without destroying the effectiveness of the catalyst mixture; accordingly, the catalyst mixture can be conveniently prepared in advance and utilized when needed. Included within the scope of this invention are sulfur compounds and organic sulfur dioxide adducts which release sulfur dioxide under the conditions of the reaction.

Polymerization utilizing the catalysts of the present invention may be carried out in any of the various manners utilized in liquid phase polymerizations. One preferred method consists in admixing the monomers in a solvent such as benzene, toluene or other liquid aromatic hydrocarbons, and adding the catalyst mixture, whereupon polymerization occurs to form the desired polymer. Since sulfur dioxide is ordinarily a gaseous material, it is desirable to first prepare a solution of the gas in benzene, toluene, trichlorobenzene or other solvent material, and then add the resulting solution to the monomer mixture. The polymerization may be carried out in aliphatic solvents such as hexane or heptane wherein the polymer separates as it is formed, and such halogenated compounds as ethyl chloride, chloroform and the like. The polymerization may also be carried out in mass, that is, simply by admixing the monomers with the catalyst mixture in the absence of solvent media and/or other materials. It is important when utilizing any of the above methods of polymerization that the polymerization mixture be free from impurities such as water, amines and the like, which initiate the ionic homopolymerization of vinylidene cyanide, that is, the polymerization should be carried out in a non-ionic medium.

The polymerizations are usually carried out at room temperatures. However, polymerization by the method of this invention also occurs quite readily at temperatures as low as $-50°$ C. or even lower; in fact, it is desirable to operate the process at low temperatures, since the reaction rate of the competing Diels-Alder reaction is very slow at temperatures below about $0°$ C. Higher temperatures, for example, as high as $100°$ C. or even higher, may be utilized, provided suitable equipment is utilized.

The following examples in which parts are by weight, unless otherwise specified, are illustrative of the process of this invention, but are not intended to limit the scope of the invention, for there are, of course, numerous possible variations and modifications.

*Examples I to IV*

In order to demonstrate the improved catalysts of the present invention, the following master solution is first prepared:

| | Parts |
|---|---|
| Benzene | 309.0 |
| Butadiene-1,3 | 16.6 |
| Styrene | 8.4 |
| Vinylidene cyanide | 19.8 |

A second solution consisting of sulfur dioxide in benzene is prepared so that one volume of the solution contains 0.0408 part of sulfur dioxide. 10 ml. of thiophenol are dissolved in 90 ml. of benzene. Polymerizations are then conducted utilizing the above solutions and the mixtures are polymerized at $20°$ C. In Example I no catalyst is utilized, and in Examples II, III and IV a combination of sulfur dioxide and an organic thiol is utilized. The pertinent data are recorded below.

| Example | I | II | III | IV |
|---|---|---|---|---|
| Volumes master solution, ml | 50 | 50 | 50 | 50 |
| Volumes SO₂ solution, ml | 0.0 | 1.0 | 4 | 4 |
| ml. benzenethiol solution | 0.0 | 0.0 | 0.87 | 1.7 |
| ml. tertiary-butylthiol (as is) | 0.0 | 0.087 | 0.0 | 0.0 |
| Polymerization time (hours) | 43 | 43 | 19 | 19 |
| Parts polymer | 1.58 | 3.70 | 4.01 | 3.93 |
| Conversion of vinylidene cyanide to polymer | 38.5 | 90 | 97.8 | 95.8 |

Excellent vinylidene cyanide-diene copolymers are also obtained by utilizing a combination of sulfur dioxide and an organic thiol as catalysts.

*Example V*

A master solution of 10 grams of butadiene-1,3 and 200 grams of benzene is prepared. 32 ml. of this solution, 7 ml. of benzene, 2 grams of vinylidene cyanide, 1.3 ml. of 10% thiocresol in benzene and 1 ml. of a solution of 4.8 grams of SO₂ in 100 ml. of benzene are held in a polymerization vessel at $20°$ C. for 19 hours. A conversion of monomers to polymer of 90% is obtained.

When the above examples are repeated utilizing other dienes instead of butadiene-1,3, other polymerizable monomers instead of styrene and other thiols, useful polymeric materials are obtained.

The polymers prepared according to the process of the present invention have definite softening points and are extremely useful in the preparation of excellent filaments and films.

Although the invention has been described with reference to specific examples, it is not intended to limit the invention solely thereto, for numerous variations and modifications will be apparent to those skilled in the art and are included within the scope of the appended claims.

We claim:

1. The method which comprises polymerizing in the absence of water a mixture of monomeric materials, at least two of which are vinylidene cyanide and an aliphatic conjugated diene, with a catalyst combination of from 0.002 to 5.0% each of an organic thiol and sulfur dioxide.

2. The method which comprises polymerizing in a non-ionic medium in the absence of water a mixture of monomeric materials, at least two of which are vinylidene cyanide and an aliphatic conjugated diene, with a catalyst combination of from 0.01 to 5.0% an aromatic thiol and sulfur dioxide.

3. The method of claim 2 wherein the aromatic thiol is benzenethiol.

4. The method of claim 2 wherein the aromatic thiol is naphthalenethiol.

5. The method of claim 2 wherein the aromatic thiol is toluenethiol.

6. The method which comprises polymerizing in a non-ionic medium in the absence of water a mixture of monomeric materials, at least two of which are vinylidene cyanide and an aliphatic conjugated diene, with a catalyst combination of from 0.01 to 5.0% an aliphatic organic thiol and sulfur dioxide.

7. The method of claim 6 wherein the aliphatic organic thiol is tertiary-butylthiol.

8. The method which comprises preparing in a non-ionic water-free medium a monomeric mixture consisting essentially of vinylidene cyanide, butadiene-1,3 and styrene, and adding to said mixture a catalyst combination of from about 1.6 to 3.2% benzenethiol and from about 0.7 to 3.0% sulfur dioxide, whereupon polymerization occurs to form an interpolymer of said vinylidene cyanide, butadiene-1,3 and styrene.

9. The method which comprises preparing in a non-ionic water-free medium a monomeric mixture consisting essentially of vinylidene cyanide and butadiene-1,3, and adding to said mixture a catalyst combination of from about 1.6 to 3.2% benzenethiol and from about 0.7 to 3.0% sulfur dioxide, whereupon polymerization occurs to form a copolymer of said vinylidene cyanide and butadiene-1,3.

References Cited in the file of this patent

UNITED STATES PATENTS

| | | |
|---|---|---|
| 2,281,613 | Wollthan et al. | May 5, 1942 |
| 2,383,055 | Fryling | Aug. 21, 1945 |